(No Model.)
T. C. BELDING.
ROD FOR BEADING MACHINES.
No. 433,437. Patented Aug. 5, 1890.
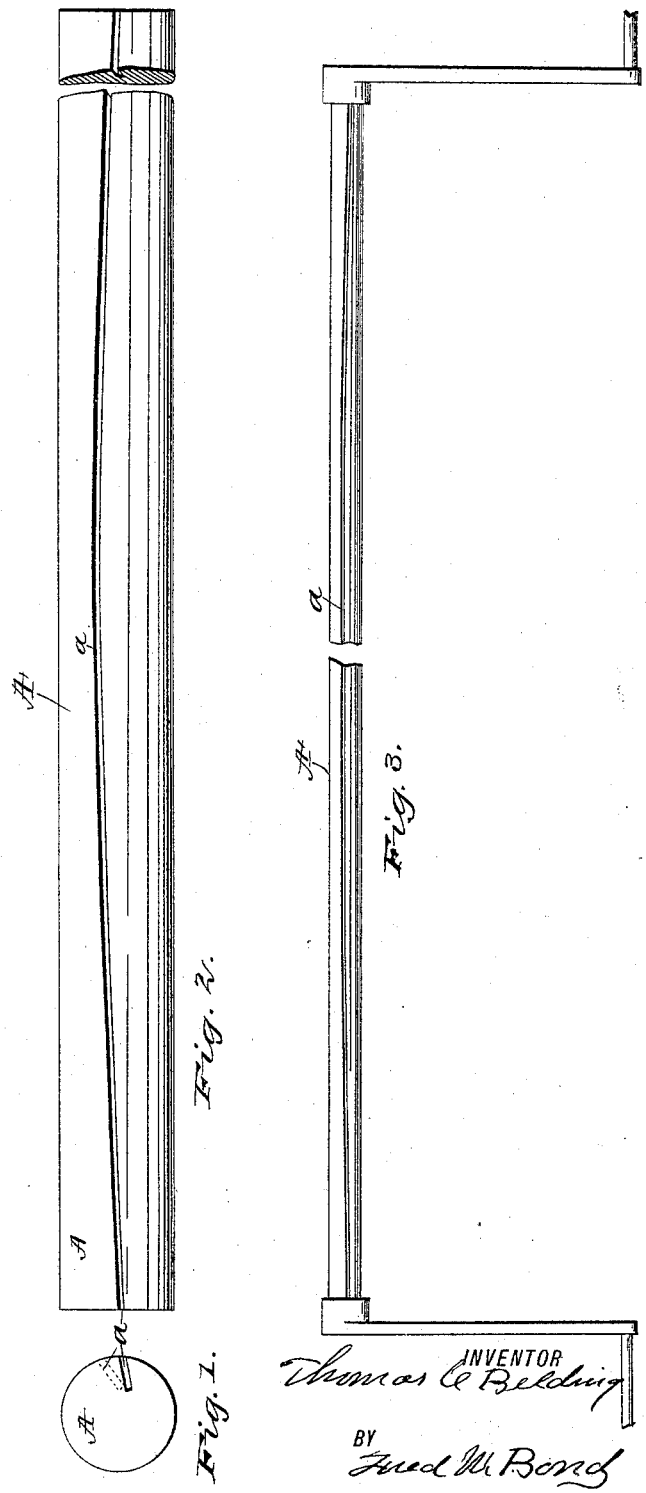
WITNESSES:
Ed. G. Lane
T. C. Snyder
INVENTOR
Thomas C. Belding
BY
Fred M. Bond
ATTORNEY.

UNITED STATES PATENT OFFICE.

THOMAS C. BELDING, OF CANTON, OHIO, ASSIGNOR TO THE CANTON STEEL ROOFING COMPANY, OF SAME PLACE.

ROD FOR BEADING-MACHINES.

SPECIFICATION forming part of Letters Patent No. 433,437, dated August 5, 1890.

Application filed May 26, 1890. Serial No. 353,176. (No model.)

*To all whom it may concern:*

Be it known that I, THOMAS C. BELDING, a citizen of the United States, residing at Canton, in the county of Stark and State of Ohio, have invented certain new and useful Improvements in Rods for Beading-Machines; and I do hereby declare that the following is a full, clear, and exact description of the same, reference being had to the annexed drawings, making a part of this specification, and to the letters and figures marked thereon, in which—

Figure 1 is an end view. Fig. 2 is a view of the rod proper, showing the same enlarged so to better show the curved groove. Fig. 3 is a view of the rod, showing the handles attached thereto and illustrating the curved groove.

The present invention has relation to rods designed and calculated to be used in beading-machines for forming beads upon eaves-troughs; and it consists in the peculiar construction hereinafter described, and pointed out in the claims.

Similar letters of reference indicate corresponding parts in each figure of the drawings.

In the accompanying drawings, A represents the rod, which may be formed of any desired length, reference being had to the length of the machine in which it is calculated to be used, the diameter of the rod corresponding substantially with the diameter of the bead to be formed upon the eaves-trough.

The beading-rod A is provided with the curved groove $a$, which is preferably formed at an angle to a radial line substantially as illustrated in Fig. 1, and is so formed for the purpose of better holding the sheet of metal, and at the same time forming a sharper edge upon one side of the groove. This curved groove $a$ extends the entire length of the rod, or that part of the rod which receives the edge of the sheet of metal upon which a bead is to be formed. Heretofore the longitudinal groove formed in beading-rods of this kind have been straight, and as these rods are necessarily small in diameter, their ends twist or spring in advance of their centers, which causes the center of the groove to fall or lag behind, thereby leaving the center or middle portion of an eaves-trough bead insufficiently wrapped. I prefer to form the curved groove $a$ as follows: The rod in which the groove is to be cut or formed is clamped in a vise at its center and the ends of the rod twisted or sprung in the direction desired and securely held or clamped. This admits of the groove being cut or formed in a straight line from end to end. The rod is then released, permitting it to assume its normal position, thereby curving the groove $a$ and springing or bowing the same out of the right line longitudinal of said bar A, as illustrated in Figs. 2 and 3.

In use, when power is applied, the ends of the rod A will spring or twist, and thereby rotate slightly in advance of the center portion of the rod on account of the resistance of the metal upon which the bead is being formed, said resistance having the effect of straightening the groove, thereby causing the bead to be wrapped or folded uniformly from end to end.

It will be understood by my peculiar arrangement I am enabled to form long sections of eaves-troughs having beads of uniform diameter from end to end substantially straight throughout their entire lengths.

It will be understood that in use power can be applied only at the ends of the beading-rod A owing to the fact that the sheet of metal upon which the bead is formed covers the beading-rod.

Having fully described my invention, what I claim is—

1. In an edging device for sheet metal, a beading-rod provided with a holding-groove peripherally sprung or bowed from a right line longitudinal of said rod, substantially as and for the purpose specified.

2. In an edging device for sheet metal, a beading-rod provided with a holding-groove peripherally sprung or bowed from a right line longitudinal of said rod and said groove cut at an angle to the radius-line of the rod, substantially as and for the purpose specified.

In testimony that I claim the above I have hereunto subscribed my name in the presence of two witnesses.

THOMAS C. BELDING.

Witnesses:
T. C. SNYDER,
F. W. BOND.